(12) United States Patent
Okuno et al.

(10) Patent No.: US 12,381,841 B2
(45) Date of Patent: Aug. 5, 2025

(54) INFORMATION PROCESSING DEVICE, INFORMATION PROCESSING METHOD AND INFORMATION PROCESSING PROGRAM

(71) Applicant: OMOIDE Inc., Tokyo (JP)

(72) Inventors: Kazuhiro Okuno, Tokyo (JP); Hiroki Takeda, Tokyo (JP); Yuki Ogihara, Tokyo (JP)

(73) Assignee: OMOIDE Inc.

( * ) Notice: Subject to any disclaimer, the term of this patent is extended or adjusted under 35 U.S.C. 154(b) by 0 days.

(21) Appl. No.: 18/557,052

(22) PCT Filed: May 2, 2022

(86) PCT No.: PCT/JP2022/019511
§ 371 (c)(1),
(2) Date: Oct. 25, 2023

(87) PCT Pub. No.: WO2022/234845
PCT Pub. Date: Nov. 10, 2022

(65) Prior Publication Data
US 2024/0223525 A1    Jul. 4, 2024

(30) Foreign Application Priority Data
May 7, 2021   (JP) ................................. 2021-079278

(51) Int. Cl.
*G06F 15/16* (2006.01)
*H04L 51/224* (2022.01)
*H04L 51/226* (2022.01)

(52) U.S. Cl.
CPC .......... *H04L 51/226* (2022.05); *H04L 51/224* (2022.05)

(58) Field of Classification Search
CPC ............................ H04L 51/226; H04L 51/224
(Continued)

(56) References Cited

U.S. PATENT DOCUMENTS

| 9,137,294 B2 | 9/2015 | Loew |
| 2009/0144385 A1* | 6/2009 | Gold ...................... G06Q 30/00 709/206 |

(Continued)

FOREIGN PATENT DOCUMENTS

| JP | 2002-92202 A | 3/2002 |
| JP | 2002-269007 A | 9/2002 |

(Continued)

OTHER PUBLICATIONS

International Search Report for PCT/JP2022/019511 dated Aug. 9, 2022.
(Continued)

*Primary Examiner* — Vivek Srivastava
*Assistant Examiner* — Karina J Garcia-Ching
(74) *Attorney, Agent, or Firm* — Yokoi & Co., U.S.A.; Toshiyuki Yokoi

(57) ABSTRACT

Provided with a technology capable of delivering a memory of a user to the future easily and facilitating to deliver the memory. An information processing device of the present disclosure is an information processing device for managing a message posted by a user. The information processing device includes a control unit configured to acquire the message posted by the user and transmit the message to a predetermined recipient in accordance with a predetermined distribution schedule, the predetermined recipient being preliminarily determined, wherein the control unit is further configured to transmit a notification to a user terminal of the user at a predetermined timing for guiding the user to post the message.

3 Claims, 9 Drawing Sheets

(58) Field of Classification Search
USPC .......................................................... 709/206
See application file for complete search history.

(56) References Cited

U.S. PATENT DOCUMENTS

| | | |
|---|---|---|
| 2011/0082747 A1 | 4/2011 | Khan et al. |
| 2013/0325979 A1 | 12/2013 | Mansfield et al. |
| 2014/0025591 A1 | 1/2014 | Villa, III |
| 2014/0181149 A1 | 6/2014 | Ilan et al. |
| 2015/0302353 A1* | 10/2015 | Morishita ............ G06Q 10/101 705/300 |
| 2015/0319129 A1* | 11/2015 | Dismuke ................ H04W 4/02 455/456.1 |
| 2016/0191446 A1* | 6/2016 | Grol-Prokopczyk ........................ G06F 3/04817 709/206 |
| 2018/0144389 A1* | 5/2018 | Fredrich ............ G06Q 30/0271 |

FOREIGN PATENT DOCUMENTS

| | | |
|---|---|---|
| JP | 2005-182296 A | 7/2005 |
| JP | 2013-101549 A | 5/2013 |
| JP | 2015-118642 A | 6/2015 |
| JP | 3219068 U | 11/2018 |
| JP | 2021-33864 A | 3/2021 |

OTHER PUBLICATIONS

PCT written opinion dated Aug. 9, 2022.
Extended European Search Report dated Mar. 4, 2025.

\* cited by examiner

Fig. 5A posted message

| No. | posted date | message |
|---|---|---|
| 1 | January 1, 2018 | ○○○ |
| 2 | January 8, 2018 | △△△ |
| 3 | January 15, 2018 | □□□ |
| ... | ... | ... |
| ... | ... | ... |
| 51 | February 1, 2019 | ▽▽▽ |
| 52 | February 8, 2019 | ◇◇◇ |

Fig. 5B distribution schedule

| distribution date | distribution message |
|---|---|
| April 1, 2019 | No.1 : ○○○ |
| April 8, 2019 | No.2 : △△△ |
| April 15, 2019 | No.3 : □□□ |
| ... | ... |
| ... | ... |
| May 1, 2020 | No.51 : ▽▽▽ |
| May 8, 2020 | No.52 : ◇◇◇ |

Fig. 6

| third user ID | age | gender | health condition | delivery interval |
|---|---|---|---|---|
| A | 45 | male | good | same as posting interval |
| B | 80 | female | good | same as posting interval |
| C | 88 | male | normal | one seventh of posting interval |

INFORMATION PROCESSING DEVICE, INFORMATION PROCESSING METHOD AND INFORMATION PROCESSING PROGRAM

TECHNICAL FIELD

The present invention relates to an information processing device, an information processing method and an information processing program for managing a predetermined message posted by a user.

BACKGROUND ART

Conventionally, a time capsule is known as a means for delivering a message to the future. In a general time capsule, a capsule storing messages is buried in the ground in many cases.

On the other hand, a system of storing electronic message and transmitting it at a predetermined timing is known. For example, Patent document 1 discloses the system for receiving and storing the message transmitted from a sender as a text document, a sound or an image and transmitting it on the date designated by the user in the future.

In addition, there is a desire to leave a message to the bereaved family and friends when we pass away. Patent document 2 discloses a delivery system capable of delivering items such as a letter on the designated date to a person designated during the lifetime.

PRIOR ART DOCUMENTS

Patent Documents

[Patent document 1] Japanese Patent Application Publication No. 2002-269007
[Patent document 2] Japanese Utility Patent Registration No. 3219068

DISCLOSURE OF THE INVENTION

Problems to be Solved by the Invention

In response to the desire to leave a message to the bereaved family and friends when we pass away, the technology shown in Patent document 2 enables to deliver the item by the delivery system after we passed away. However, the item to be delivered is a letter, a small article, a photograph, a storage medium or the like. Thus, it requires much labor for a deliverer to store the item to be delivered in a warehouse or the like.

On the other hand, in the technology described in Patent document 1, it seems that the message can be delivered relatively easily on the designated date in the future by transmitting the message to the final recipient via the Internet. However, in the above described system, if the sender forgets to register the message in the system, it is impossible to transmit the message to the final recipient as a matter of course. Furthermore, there is still room for improvement in the technology of not only delivering the message posted by the user to the future easily but also facilitating to post the message.

The purpose of the present disclosure is to provide the technology capable of delivering a memory of a user to the future easily and facilitating to deliver the memory.

Means for Solving the Problem

An information processing device of the present disclosure is an information processing device for managing a message posted by a user. The information processing device includes a control unit configured to acquire the message posted by the user and transmit the message to a predetermined recipient in accordance with a predetermined distribution schedule, the predetermined recipient being preliminarily determined. The control unit is further configured to transmit a notification to a user terminal of the user at a predetermined timing for guiding the user to post the message.

In the above described information processing device, the control unit acquires the message posted by the user and the message is transmitted to the recipient at a predetermined distribution schedule. Thus, the memory of the user can be delivered to the future easily. (Here, the recipient includes the user who posted the message and a third user as described later.) Furthermore, the control unit transmits a notification to a user terminal of the user at a predetermined timing for guiding the user to post the message. Thus, it is possible to facilitate to deliver the memory. Note that the predetermined timing can be a preliminarily determined arbitrary timing, a later described timing of obtaining a predetermined topic or a later described timing where an identification code is inputted to the user terminal.

In the above described information processing device, it is possible that the predetermined recipient is a third user different from the user who posted the message, and it is possible that the control unit is configured to start transmitting the message to the third user in accordance with the predetermined distribution schedule when the control unit determines that the user who posted the message passed away (died). In the above described configuration, the user who posted the message can easily deliver the message to the third user (e.g., family, friends) as a memory of the user who posted the message when the user passed away. Here, the control unit manages the access of the user who posted the message to a predetermined interface (e.g., application and web page) which enables to access to the above described information processing device. When the access from the user who posted the message is not received for a predetermined period of time, the control unit executes the process of determining whether or not the user who posted the message has passed away. In this case, the control unit transmits the message to the third user for confirming the safety of the user who posted the message. Thus, whether or not the user who posted the message has passed away can be determined based on the reply from the third user. At this time, the control unit can transmit the message to a plurality of third users for confirming the safety and the safety can be determined by majority of the replies from the plurality of the third users.

Furthermore, it is also possible that the control unit is configured to transmit the message to the third user at a predetermined interval while dividing the message into a plurality of times and adjust the predetermined interval in accordance with an attribute of the third user. In the above described configuration, the memory of the user who posted the message can be delivered to the third user for a relatively long period of time. In this case, the control unit can transmit the message in every predetermined period in the order of the posted time of the message posted by the user. Because of this, the life of the user who posted the message can be simulatively reproduced based on the delivered messages. In some cases, such as when the third user receiving the message from the user is old, it may be preferable that the message is transmitted while dividing the message into a plurality of times in a relatively short period of time. Therefore, the control unit can adjust the transmission interval of the message in accordance with the attribute such as the age of the third user. It is also possible for the control unit to transmit the notification in a state that a predetermined topic is included in the notification. In this case, the control unit obtains the information from a predetermined news information source and a social networking service (SNS) and transmits the notification for guiding to post the message in a state that an arbitrary topic extracted from the above described obtained information is included in the notification. Note that the control unit can transmit the above described notification at the timing when the topic is extracted as described above. Because of this, it is possible to facilitate the user to post the message. Thus, the user who posted the message can leave the opinion to be delivered to the public as the message.

On the other hand, in the above described information processing device, it is possible that the recipient is the user who posted the message, the control unit is configured to transmit the notification at a timing where an identification code associated with a predetermined facility is inputted to the user terminal, and the control unit is configured to transmit the message and a predetermined facility information obtained from the predetermined facility to the user who posted the message after a lapse of a predetermined period after the user posted the message. Here, since the recipient is the user who posted the message, the user receives the message posted by himself/herself. In this case, the motivation of opening the message is given to the user who posted the message. Thus, the rate of opening the message increases. In addition, the above described identification code is, for example, a conventionally known two-dimensional code, and the identification code is notified on the facility visited by user who posted the message. In this case, it is possible to facilitate the user who posted the message to read the identification code when the user visited to the facility. Since the notification for guiding to post the message is transmitted to the user terminal at a timing where the identification code is inputted to the user terminal of the user who posted the message, it is possible to facilitate the user to post the message. From the viewpoint of the facility to which the user who posted the message visits, since the predetermined facility information is added to the message posted by the user, it is possible to facilitate the user who posted the message to use the facility again. Note that it is possible that the predetermined facility information includes a predetermined privilege information. Consequently, it is possible to facilitate the user to post the message.

Here, it is possible that the control unit is further configured to acquire a positon information of the user terminal and manage a browsing authority of the message and the predetermined facility information which are transmitted to the user terminal. It is also possible for the control unit to permit to browse the message and the predetermined facility information when a current location of the user terminal is within a predetermined area including the predetermined facility at a time when a request for browsing the message and the predetermined facility information transmitted to the user terminal is requested by the user terminal. Because of this, it is possible to facilitate the user posting the message and desiring to look back on the memory of himself/herself to give the motivation to visit the facility. From the viewpoint of the facility, it is possible to facilitate to gather the customers of the facility.

The present disclosure can be also captured as an aspect of an information processing method executed by a computer. Namely, an information processing method of the present disclosure is an information processing method for managing a message posted by a user, the information processing method including: a step of acquiring the message posted by the user; a step of transmitting the message to a predetermined recipient in accordance with a predetermined distribution schedule, the predetermined recipient being preliminarily determined; and a step of transmitting a notification to a user terminal of the user at a predetermined timing for guiding the user to post the message, wherein the steps are executed by a computer. The present disclosure can be also captured as an aspect of an information processing program. Namely, an information processing program of the present disclosure is an information processing program for managing a message posted by a user, the information processing program is configured to make a computer execute: a step of acquiring the message posted by the user; a step of transmitting the message to a predetermined recipient in accordance with a predetermined distribution schedule, the predetermined recipient being preliminarily determined; and a step of transmitting a notification to a user terminal of the user at a predetermined timing for guiding the user to post the message.

Effects of the Invention

The present disclosure enables to deliver the memory of the user to the future easily and facilitate to deliver the memory.

BRIEF DESCRIPTION OF THE DRAWINGS

FIGS. 5A and 5B are the first drawings for explaining a distribution schedule of a message managed by a distribution management unit.

FIG. 6 is the second drawing for explaining the distribution schedule of the message managed by the distribution management unit.

MODES FOR CARRYING OUT THE INVENTION

Hereafter, the embodiments of the present disclosure will be explained based on the drawings. The configurations of the embodiments below are merely examples. The present disclosure is not limited to the configurations of the embodiments.

First Embodiment

The outline of the information processing system of the first embodiment will be explained with reference to FIG. 1.

Figure 1:
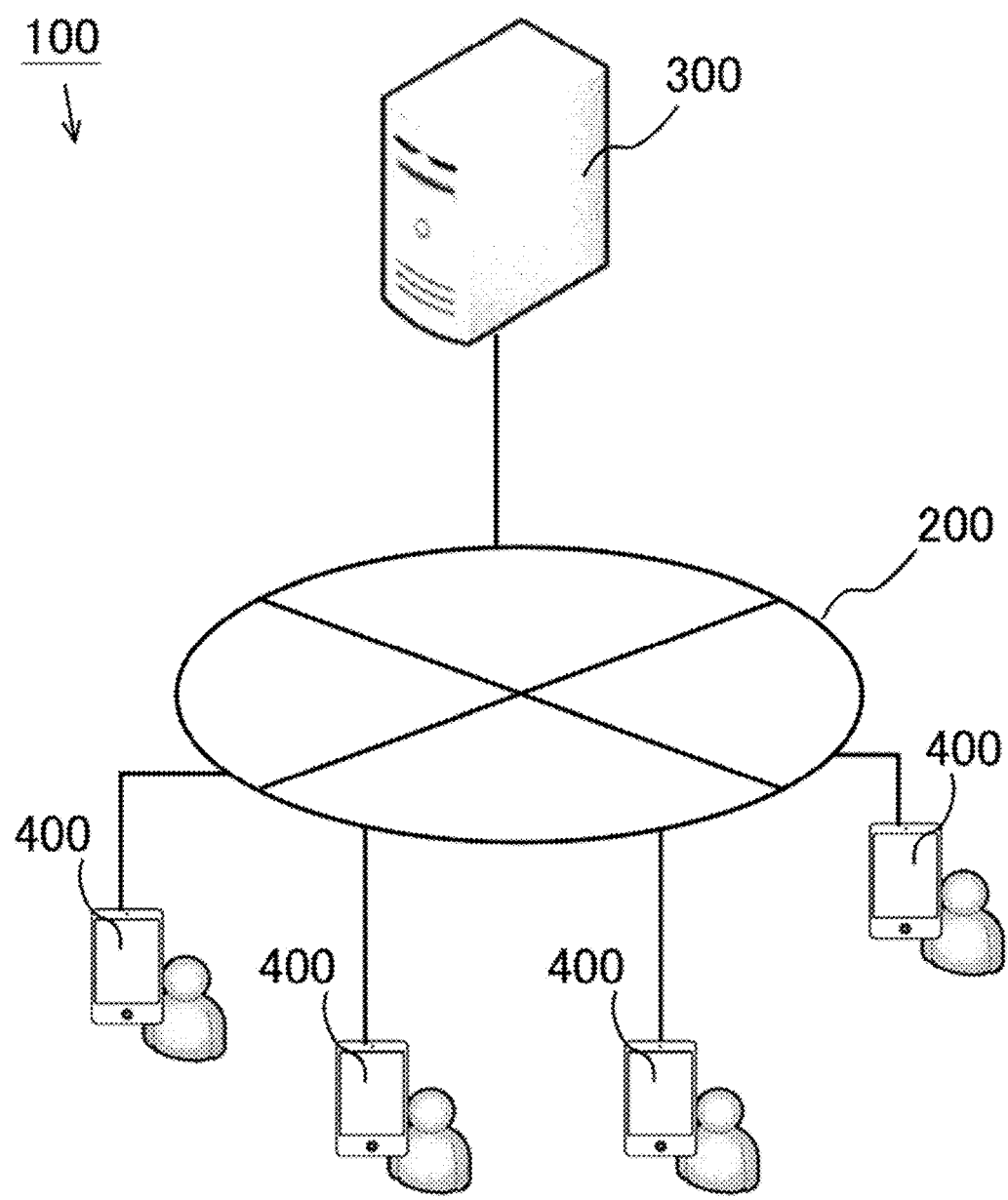
FIG. 1 is a drawing showing a brief configuration of an information processing system.

FIG. 1 is a drawing showing a brief configuration of the information processing system of the present disclosure. An information processing system 100 of the present disclosure is configured to include a network 200, a server 300 and a user terminal 400. Note that the information processing system 100 of the present disclosure is the system for managing a predetermined message posted by the user. The management of the message is executed by the server 300. In addition, the users using the information processing system 100 of the present embodiment are the users posting the message and the third users to which the message is delivered. The user posts the message during the lifetime of the user and the message is delivered to the third user (e.g., family and friends of the user who posted the message) after the user who posted the message passed away.

The network 200 is an IP network, for example. The network 200 can be wireless, wired or the combination of wireless and wired as long as the network 200 is the IP network. As the example of the wireless communication, the user terminal 400 can access a wireless LAN access point (not-illustrated) to communicate with the server 300 via LAN or WAN. The network 200 is not limited to the above described examples. The network 200 can be a public switched telephone network, an optical line, an ADSL line and a satellite communication network, for example.

The server 300 is connected with the user terminal 400 via the network 200. Although one server 300 and four user terminals 400 are shown in FIG. 1 for simplifying the explanation, it goes without saying that the configuration is not limited to these.

The server 300 can be any electronic devices as long as it is a computer device having the processing capability of executing the calculation and processing such as an acquisition, a generation and an update of the data. For example, the server 300 can be a personal computer, a server, a main frame and the other electric devices. Namely, the server 300 can be formed as a computer including a processor such as CPU and GPU, a main storage device such as RAM and ROM and an auxiliary storage device such as EPROM, a hard disk drive and a removable medium. Note that the removable medium can be a USB memory or a disk recording medium such as CD and DVD, for example. An operating system (OS), various programs, various tables and the like are stored in the auxiliary storage device.

It is possible for the server 300 to arbitrarily use SaaS (Software as a Service), PaaS (Platform as a Service) and IaaS (Infrastructure as a Service) which are achieved by a cloud server without providing a software, hardware, OS or the like dedicated for the information processing system 100 of the present disclosure.

The user terminal 400 can be any electronic devices such as a mobile terminal possessed by the user (the user posting the message and the third user) using the information processing system 100. For example, the user terminal 400 can be a mobile terminal, a tablet terminal, a smartphone, a wearable terminal, a personal computer or the other terminal devices.

Figure 2:
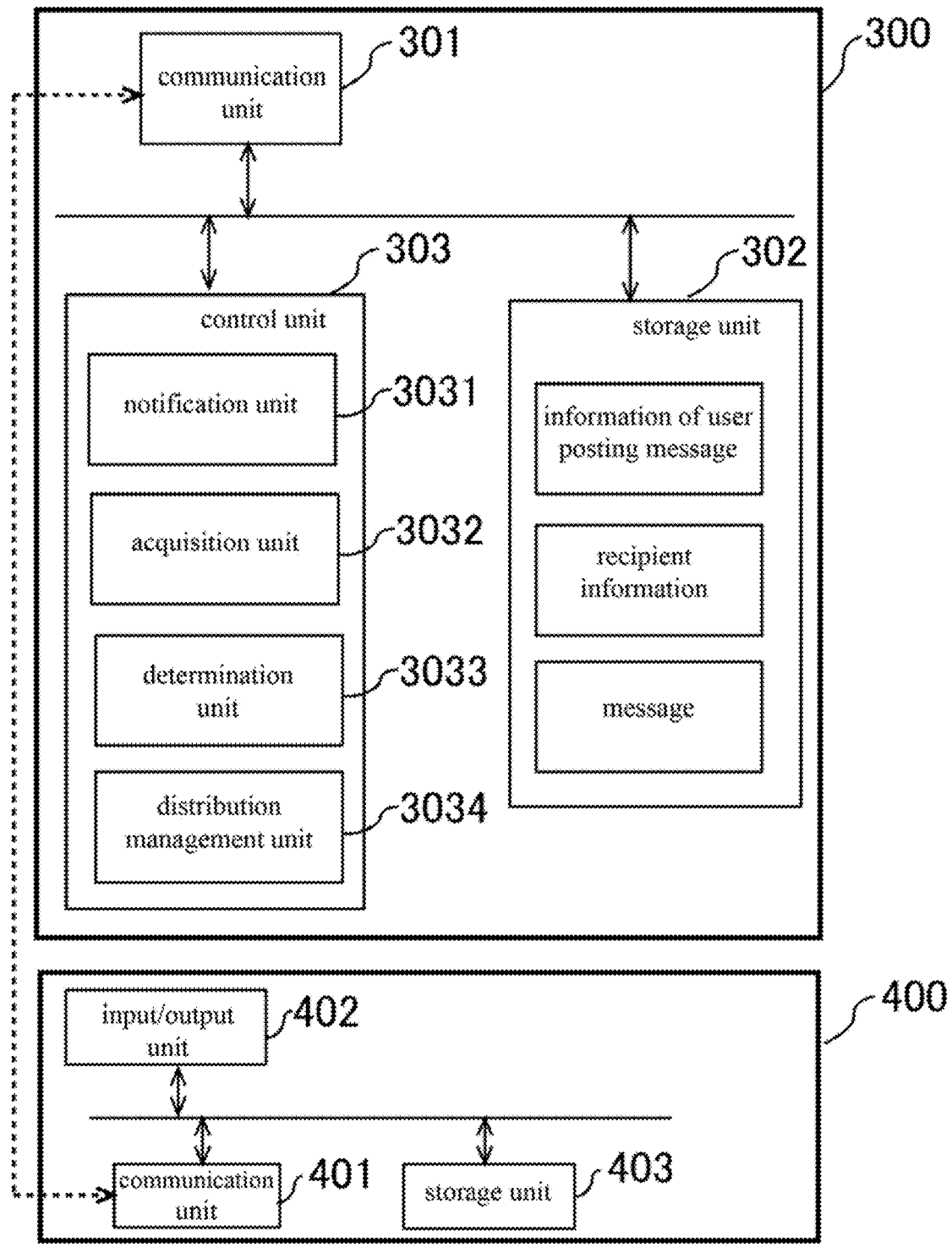
FIG. 2 is a drawing showing components of a server included in the information processing system more in detail and components of a user terminal communicated with the server.

Then, the components of the server 300 will be mainly explained in detail based on FIG. 2. FIG. 2 is a drawing showing the components of the server 300 included in the information processing system 100 more in detail and the components of the user terminal 400 communicated with the server 300.

The server 300 includes a communication unit 301, a storage unit 302 and control unit 303 as functional units. The server 300 loads the programs stored in the auxiliary storage device to an operating area of the main storage device to execute the programs. Thus, the functions matched with a predetermined purpose of each of the functional units can be achieved by controlling each of the functional units thorough the execution of the programs. A part or an entire function can be achieved by a hardware circuit such as ASIC and FPGA.

Here, the communication unit 301 is a communication interface for connecting the server 300 to the network 200. The communication unit 301 is configured to include a network interface board and a wireless communication circuit for the wireless communication, for example. The server 300 is communicatively connected to the user terminal 400 and the other external devices via the communication unit 301.

The storage unit 302 is configured to include a main storage device and an auxiliary storage device. The main storage device is a memory in which the programs executed by the control unit 303 and the data used by the programs are expanded. The auxiliary storage device is a device in which the programs executed by the control unit 303 and the data used by the programs are stored. In addition, the storage unit 302 stores the message which is the data transmitted from the user terminal 400, the information of the user who posted the message and the information of the recipient receiving the message. Note that the server 300 acquires the data transmitted from the user terminal 400 or the like via the communication unit 301.

The control unit 303 is the functional unit for executing the control executed by the server 300. The control unit 303 can be achieved by an arithmetic processing device such as CPU. The control unit 303 is configured to further include four functional units of a notification unit 3031, an acquisition unit 3032, a determination unit 3033 and a distribution management unit 3034. Each of the functional units can be achieved by executing the stored programs by CPU.

The notification unit 3031 transmits the notification at a predetermined timing to the user terminal 400 of the user posting the message for guiding the user to post the message. As described above, the information of the user posting the message is stored in the storage unit 302 of the server 300 and the notification unit 3031 can transmit the above described notification based on the information of the user posting the message. Note that the predetermined timing is a preliminarily determined arbitrary timing (e.g., 6 p.m. of every Sunday), for example.

Here, the user terminal 400 of the present disclosure includes a communication unit 401, an input/output unit 402 and a storage unit 403 as the functional units. The communication unit 401 is a communication interface for connecting the user terminal 400 to the network 200. The communication unit 401 is configured to include a network interface board and a wireless communication circuit for the wireless communication, for example. The input/output unit 402 is a functional unit for displaying the information and the like transmitted from outside via the communication unit 401 and inputting the above described information to outside via the communication unit 401. Similar to the storage unit 302 of the server 300, the storage unit 403 is configured to include a main storage device and an auxiliary storage device.

The input/output unit 402 further includes a display unit 4021, an operation input unit 4022 and an image/sound input/output unit 4023. The display unit 4021 has the function of displaying various information. The display unit 4021 is achieved by displays such as LCD (Liquid Crystal Display), LED (Light Emitting Diode) and OLED (Organic Light Emitting Diode), for example. The operation input unit 4022 has the function of receiving the operation input from the user. Specifically, the operation input unit 4022 is achieved by soft keys such as a touch panel or hard keys. The image/sound input/output unit 4023 has the function of receiving the input of still images and moving images, for example. Specifically, the image/sound input/output unit 4023 is achieved by a camera using image sensors such as Charged-Coupled Devices (CCD), Metal-oxide-semiconductor (MOS) and Complementary Metal-Oxide-Semiconductor (CMOS). In addition, the image/sound input/output unit 4023 has the function of receiving the input/output of the sound. Specifically, this function is achieved by a microphone and a speaker.

Figure 3A:
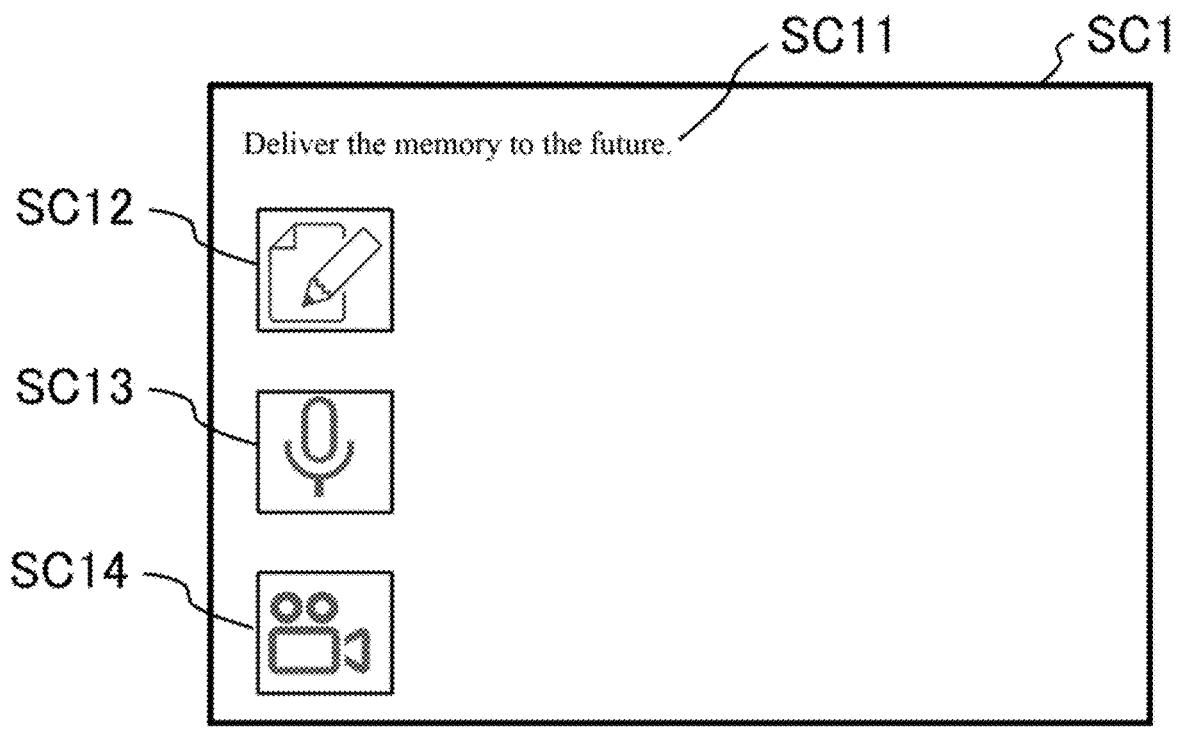
FIGS. 3A and 3B are drawings illustrating screens for inputting a message in the first embodiment.
Figure 3B:
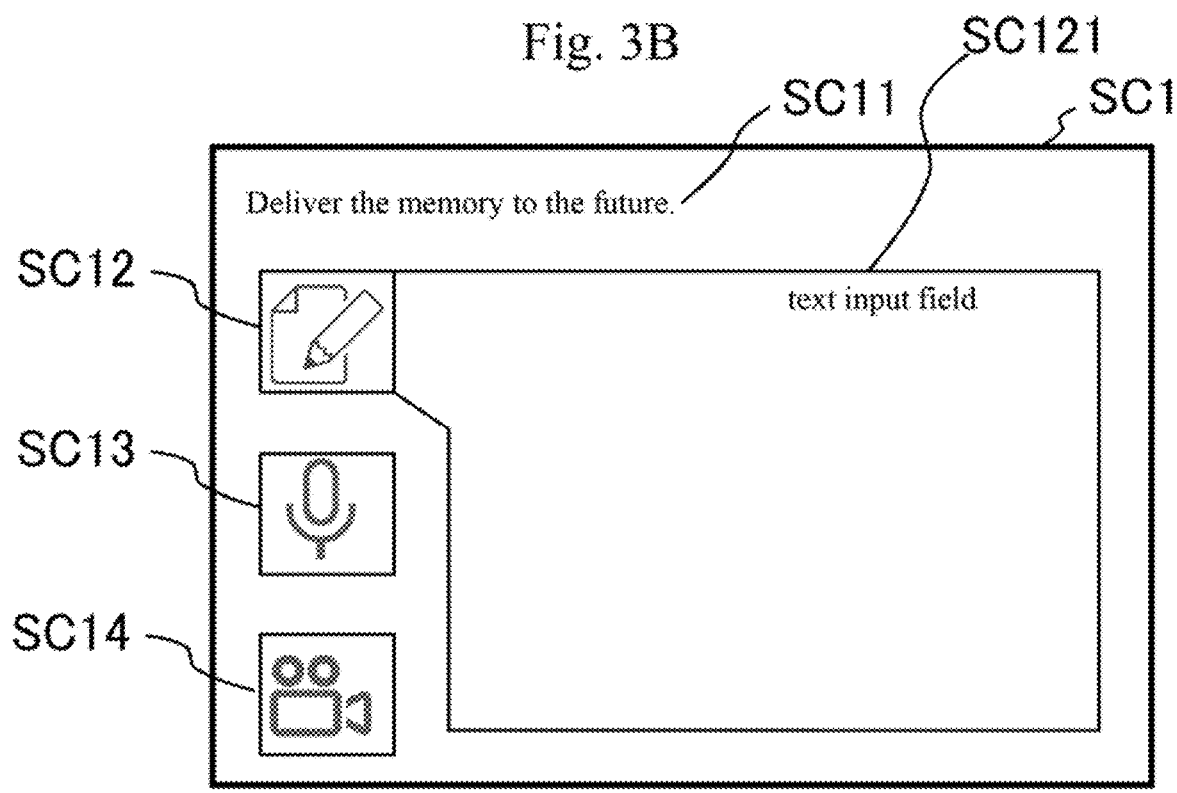

The user posting the message can view the notification by using the user terminal 400 configured as described above. Here, the notification unit 3031 can provide an interface for posting the message to the user terminal 400. Consequently, the user posting the message can post the message by inputting the message in the above described interface via the user terminal 400. FIGS. 3A and 3B are drawings illustrating the screens for inputting the message in the present embodiment. The notification unit 3031 can provide the interface shown in FIGS. 3A and 3B by transmitting a link to a predetermined webpage to the user terminal 400. Alternatively, it is also possible to provide the above described interface via a predetermined application preliminarily installed in the user terminal 400 of the user posting the message. The screen SC1 illustrated in FIG. 3A displays a comment SC11 from the system, a text input selection button SC12, a sound input selection button SC13 and an image input selection button SC14. The user posting the message displays the interface for inputting the message via the screen SC1 illustrated in FIGS. 3A and 3B on the display unit 4021 of the user terminal 400. Thus, the user can input the message by using the operation input unit 4022 and the image/sound input/output unit 4023.

For example, when the user posting the message presses the text input selection button SC12, a text input field SC121 is displayed as shown in FIG. 3B. Because of this, the user posting the message can input the message in the text input field SC121 by using the operation input unit 4022. When the user posting the message presses the sound input selection button SC13 or the image input selection button SC14, the user posting the message can input the sound, image and moving image as the message by using the image/sound input/output unit 4023.

Returning to FIG. 2, the acquisition unit 3032 acquires the message posted by the user posting the message. As described above, the user posting the message can post the message via a predetermined interface. Accordingly, the acquisition unit 3032 acquires the message by acquiring the information transmitted from the user terminal 400 of the user posting the message and stores the acquired message in the storage unit 302 of the server 300. Note that the message can include the sound information and the image information in addition to the text information.

In the present embodiment, as described above, the user posting the message posts the message during the lifetime and the message is delivered to the third user (e.g., family and friends of the user who posted the message) after the user who posted the message passed away. Therefore, the determination unit 3033 determines the safety (alive or death) of the user who posted the message.

For details, the determination unit 3033 manages the access of the user who posted the message to a predetermined interface (e.g., application, webpage) which enables the access to the information processing system 100. When the access from the user who posted the message is not received for a predetermined period of time, the determination unit 3033 transmits the message to the user terminal 400 of the user who posted the message for confirming the safety of the user. Note that the above described predetermined period of time is an arbitrary period which can be preliminarily determined by the user posting the message. When the reply about the safety cannot be obtained from the user who posted the message, then the determination unit 3033 transmits the message to the third user for confirming the safety of the user who posted the message. Here, the third user is the user different from the user who posted the message. For example, the third user is the family and the friends of the user who posted the message. In this case, the determination unit 3033 determines whether or not the user who posted the message passed away based on the reply from the third user. At this time, the control unit can transmit the message to a plurality of third users for confirming the safety. Thus, the safety can be determined by majority of the replies of the plurality of the third users.

When the determination unit 3033 determines that the user who posted the message passed away, the distribution management unit 3034 starts to transmit the message to the third user in accordance with the distribution schedule. The details of the processing of the distribution management unit 3034 will be described later.

Note that a control unit 303 executes the processing of the notification unit 3031, the acquisition unit 3032, the determination unit 3033 and the distribution management unit 3034 to function as the control unit of the present disclosure.

Figure 4:
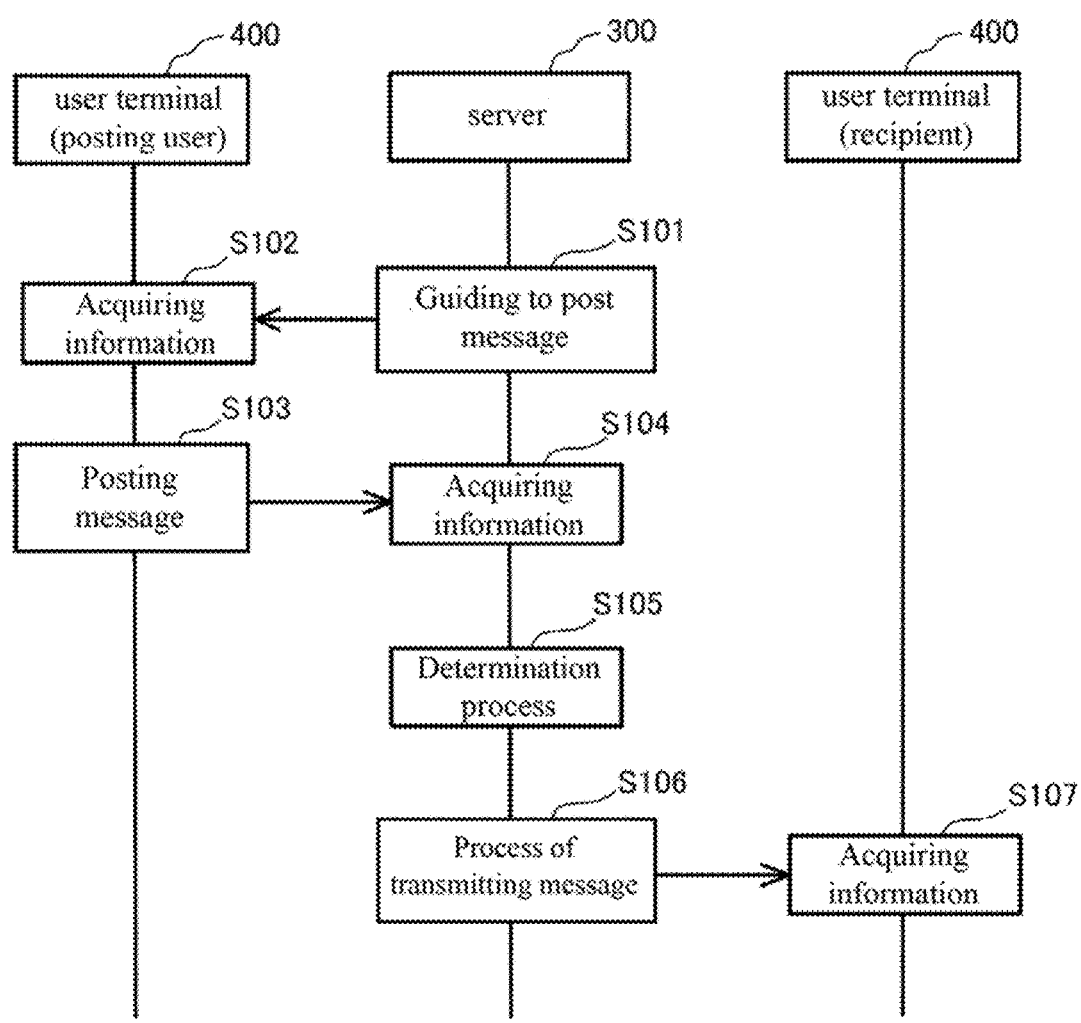
FIG. 4 is a drawing illustrating an operation flow of the information processing system.

Here, the flow of the operations of the information processing system 100 of the present disclosure will be explained. FIG. 4 is a drawing illustrating the operation flow of the information processing system 100 of the present disclosure. In FIG. 4, the operation flow of the components and the processing executed by the components of the information processing system 100 of the present disclosure will be explained.

In the present embodiment, first of all, the server 300 notifies the guidance for posting the message (S101). The server 300 transmits the notification at a predetermined timing to the user terminal 400 of the user posting the message for guiding the user to post the message. Then, the user terminal 400 of the user posting the message acquires the information related to the guidance for posting the message transmitted from the server 300. Note that the above described predetermined timing can be a preliminarily determined arbitrary timing or the timing when the server 300 extracts a later described predetermined topic.

Then, the user posts the message via the user terminal 400 of the user posting the message (S103). The user can post the message via a predetermined interface by displaying the predetermined interface, which is notified by the server 300 as the guidance of posting the message, on the user terminal 400. The message posted as described above is transmitted from the user terminal 400 to the server 300. Thus, the server 300 acquires the message (S104). At this time, the server 300 stores the acquired message in the storage unit 302.

Then, the server 300 executes the process of determining the safety of the user who posted the message (S105). The details of the process of determining the safety are as described above. When it is determined that the user who posted the message passed away, the server 300 executes the process of transmitting the message of the user stored in the storage unit 302 (S106).

Here, the third user which is the recipient receiving the message from the user who posted the message frequently feels lonely about the fact that he/she cannot talk with the dead user who posted the message any more. Therefore, it is possible for the distribution management unit 3034 included in the control unit 303 of the server 300 to transmit the message to the third user at a predetermined interval while dividing the message into a plurality of times. Because of this, the memory of the user who posted the message can be delivered to the third user for a relatively long period of time. Thus, the third user can feel as if he/she talks with the user who posted the message.

In this case, the distribution management unit 3034 can transmit the message in every predetermined period in the order of the posted time of the message posted by the user. Here, FIGS. 5A and 5B are the first drawings for explaining the distribution schedule of the message managed by the distribution management unit 3034. For example, as shown in FIG. 5A, when the user posted 52 messages from Jan. 1, 2018 to Feb. 8, 2019 at an interval of approximately one week, the posted messages are stored in the storage unit 302 of the server 300 together with the posted date of the message and the message identification number. When it is determined that the user who posted the message is passed away, the distribution management unit 3034 starts to transmit the message to the third user in accordance with the distribution schedule. The distribution management unit 3034 starts to transmit the message from Apr. 1, 2019 as shown in FIG. 5B, for example. The distribution management unit 3034 transmits the message in every predetermined period in the order from the first message posted by the user on Jan. 1, 2018. In the example shown in FIG. 5B, the second message posted on Jan. 8, 2018 is transmitted at the same interval as the interval where the message is posted by the user. Namely, the second message posted by the user is transmitted on Apr. 8, 2019 which is the seven days later than the date where the first message is transmitted. Since the distribution schedule is specified by the distribution management unit 3034 as described above, the life of the user who posted the message can be simulatively reproduced based on the messages delivered to the third user. Note that the above described configuration is merely an example. It is possible for the distribution management unit 3034 to transmit the message in accordance with a preliminarily determined distribution schedule. In this case, the user posting the message can specify the above described distribution schedule during the lifetime, for example. In addition, the present invention does not intend to limit the order of transmitting the messages to the third user as described above. It is possible for the distribution management unit 3034 to transmit the messages to the third user randomly without depending on the order of the date where the message is posted by the user.

When the third user is old, for example, there is a risk that the third user may pass away before the third user receives all messages of the user who posted the message. In that case, all of the memory of the user who posted the message cannot be delivered to the third user.

Therefore, the distribution management unit 3034 can adjust the above described interval in accordance with the attribute of the third user. FIG. 6 is the second drawing for explaining the distribution schedule of the message managed by the distribution management unit 3034. In the example shown in FIG. 6, the third users receiving the message from the user posting the message are three. For example, the user having the ID of "A" is a son of the user who posted the message, the user having the ID of "B" is a wife of the user who posted the message, and the user having the ID of "C" is a friend of the user who posted the message. The storage unit 302 of the server 300 stores the attribute of the third users such as an age, a gender and a health condition of the third users as a recipient information. In this case, the distribution management unit 3034 transmits the messages to the users having the ID of "A" and "B" at a delivery interval described in the explanation of FIGS. 5A and 5B (i.e., the delivery interval is same as the posting interval). On the other hand, the distribution management unit 3034 transmits the message to the user having the ID of "C" at the delivery interval of one seventh of the delivery interval described in the explanation of FIGS. 5A and 5B (i.e., the delivery interval is one seventh of the posting interval). The user having the ID of "C" is 88 years old which exceeds the average lifetime of man. Accordingly, if the messages are transmitted at the delivery interval described in the explanation of FIGS. 5A and 5B for more than one year, there is a risk that the third user may pass away in the middle of the delivery period. Therefore, the distribution management unit 3034 transmits 52 messages, which is posted at the interval of approximately one week, at the interval of one seventh of the posting interval (i.e., one message is transmitted per day for 52 days). Because of this, it becomes easy to deliver all of the memory of the user who posted the message to the third user while simulatively reproducing the life of the user who posted the message. Although the example of adjusting the interval of delivering the messages based on the age of the third user as the attribute of the third user is explained above, it is also possible for the distribution management unit 3034 to adjust the delivery interval of the messages based on the health condition of the third user (e.g., when the health condition of the third user is bad, the delivery interval is shortened).

Returning to FIG. 4, the user terminal 400 of the recipient acquires the message transmitted from the server 300 (S107). Because of this, the memory of the user who posted the message is delivered to the third user which is the recipient.

According to the processes described above, the user posting the message can easily deliver the messages to the bereaved third user (e.g., family and friends) as the memory of the user when the user who posted the message passed away. Furthermore, it is possible to facilitate to deliver the memory since the notification unit 3031 transmits the notification to the user posting the message for guiding to post the message to the user terminal 400 at a predetermined timing.

Note that the notification unit 3031 can transmit the above described notification in a state that a predetermined topic is included. In this case, the server 300 acquires the information from a predetermined news information source and a social networking service (SNS). When the server 300 acquires the information from the SNS, it is possible to collect the topics by using Twitter (Registered Trademark) API. The notification unit 3031 can transmit the notification for guiding to post the message in a state that an arbitrarily topic extracted from the acquired information is included in the notification. In this case, the notification unit 3031 can transmit the above described notification to the user terminal 400 of the user posting the message at the timing when the topic is extracted.

Figure 7:
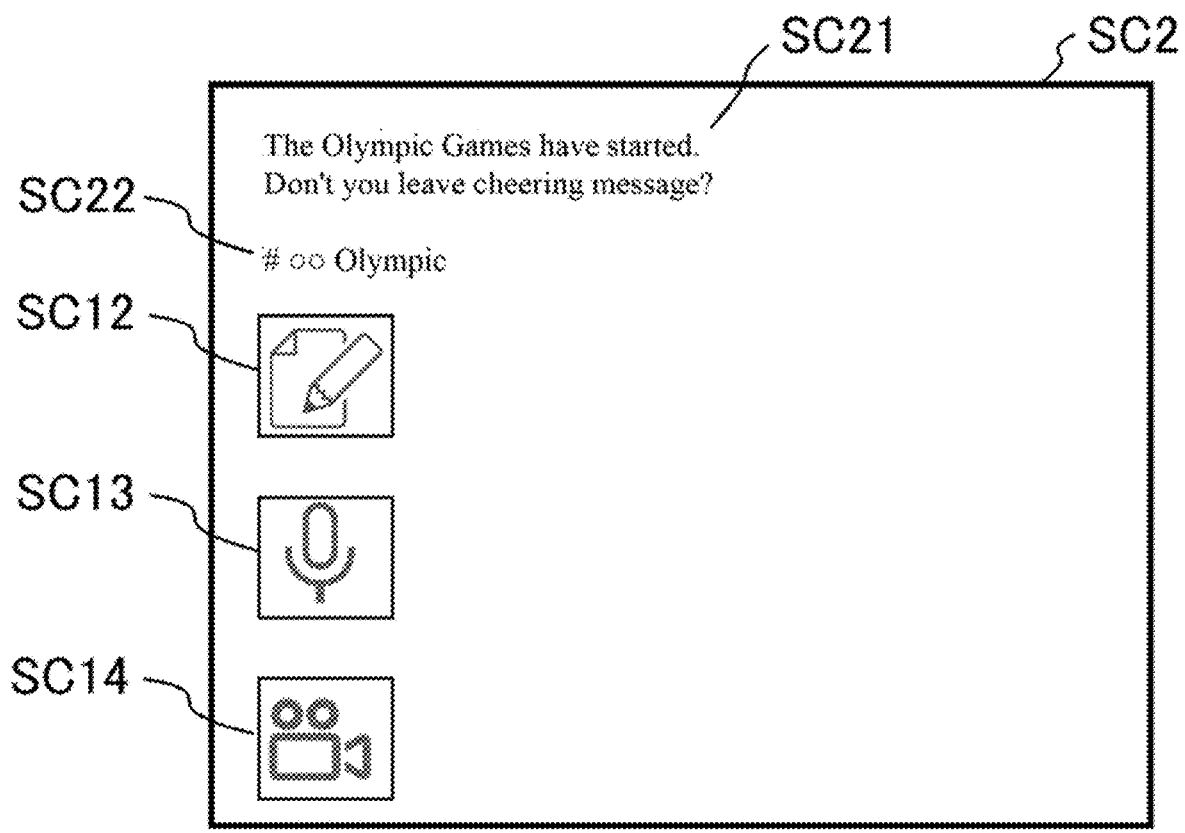
FIG. 7 is a drawing illustrating a screen for inputting a message notified in a state that a predetermined topic is included.

Here, FIG. 7 is a drawing illustrating the screen for inputting the message notified in a state that the predetermined topic is included. The screen SC2 illustrated in FIG. 7 displays a comment SC21 including the topic provided from the system and a tag information SC22 in addition to the text input selection button SC12, the sound input selection button SC13 and the image input selection button SC14 shown in FIGS. 3A and 3B. Here, the above described tag information is an arbitrary identifier for showing the topic included in the comment SC21. The tag information is generated by the notification unit 3031 similar to the comment SC21. As described above, when the posting of the message is guided while including the predetermined topic, the user posting the message is only to post the comment about the predetermined topic. Therefore, it is possible to facilitate the user to post the message suitably. In this case, the distribution management unit 3034 can transmit the message to the public without identifying the recipient of the message. Because of this, the user who posted the message can leave the opinion to be delivered to the public as the message. Note that the message transferred to the public as described above is retrievable by the above described tag information.

Furthermore, the message transmitted to the public as described above can be stored in a block chain. Since the data is stored in the block chain in time series, the stored data has a traceability. In addition, since the data stored in the block chain cannot be altered, the stored data can be accurately left in later generations. Note that it is possible to store the messages related to the same topic posted by a plurality of users in the above described block chain.

When the above described information processing system 100 is used, the memory of the user can be easily delivered to the future and it is possible to facilitate to deliver the memory.

Second Embodiment

The information processing system of the second embodiment will be explained below. In the present embodiment, the server 300 transmits the notification to the user terminal 400 of the user posting the message for guiding the user to post the message at the timing where the identification code associated with a predetermined facility is inputted to the user terminal 400. Then, the server 300 transmits the message and a predetermined facility information obtained from the facility to the user who posted the message after a lapse of a predetermined period after the user posted the message. The above described configuration will be explained based on FIG. 4 explained in the first embodiment. In the present embodiment, an example where the user visits a leisure facility such as a zoo and an aquarium or a hotel and the user posts the message at that place will be explained.

In the flow of the operation of the information processing system 100 shown in FIG. 4, the server 300 transmits the notification for posting the message (S101) and the user terminal 400 of the user who posted the message acquires the transmitted information (S102). In the present embodiment, when the user visits the leisure facility or the hotel, the user acquires the identification code associated with the facility at that place. The user posting the message reads the above described identification code by using the user terminal 400 of the user. Thus, the identification code is inputted to the user terminal 400. Note that the above described identification code is, for example, a conventionally known two-dimensional code. When the facility visited by the user posting the message is the aquarium, the identification code is notified in front of a water tank, for example. When the facility visited by the user posting the message is the hotel, the identification code is notified in a room of the hotel. Because of this, it is possible to facilitate the user posting the message to read the identification code. When the above described identification code is inputted to the user terminal 400 of the user posting the message, a predetermined webpage which is an interface for posting the message is displayed on the display unit 4021 of the user terminal 400. Namely, the server 300 transmits the notification to the user terminal 400 for guiding to post the message and the notification is displayed on the display unit 4021 of the user terminal 400 as the above described interface at the timing where the identification code is inputted to the user terminal 400 of the user posting the message. As described above, since the notification is transmitted to the user terminal 400 for guiding to post the message at the timing where the identification code is inputted to the user terminal 400 of the user posting the message, it is possible to facilitate the user to post the message.

Figure 8A:
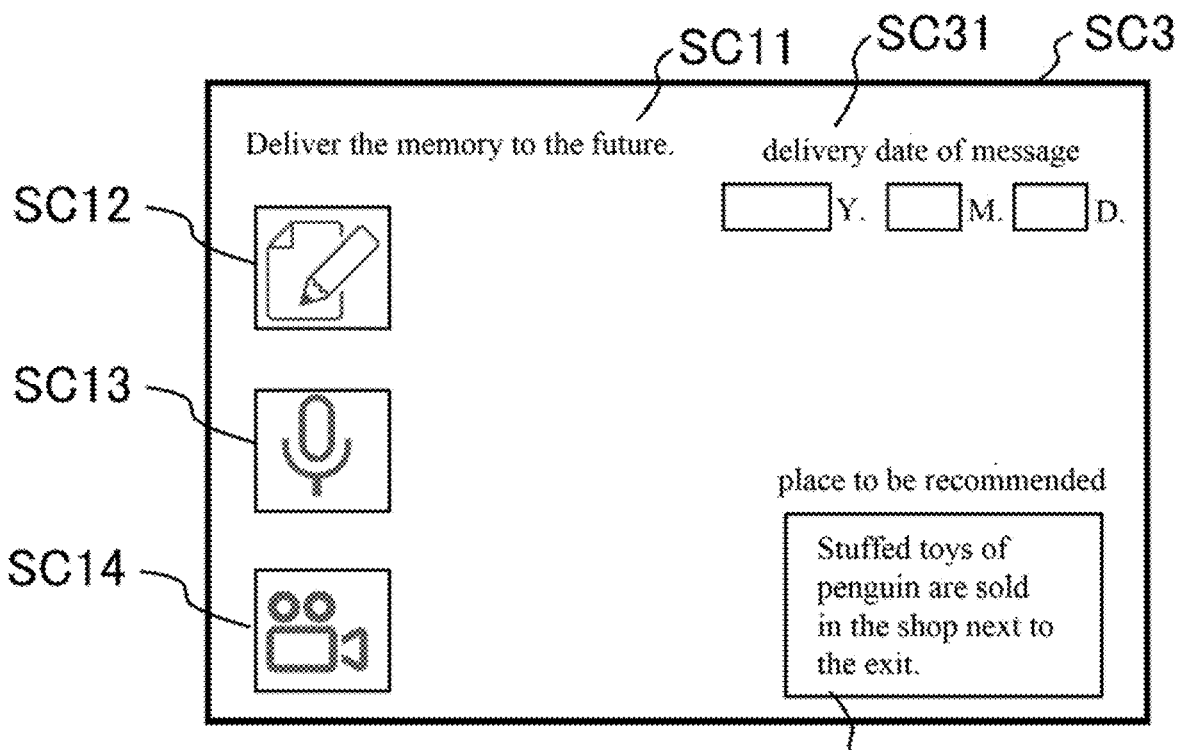
FIGS. 8A and 8B are drawings illustrating screens for inputting a message in the second embodiment.
Figure 8B:
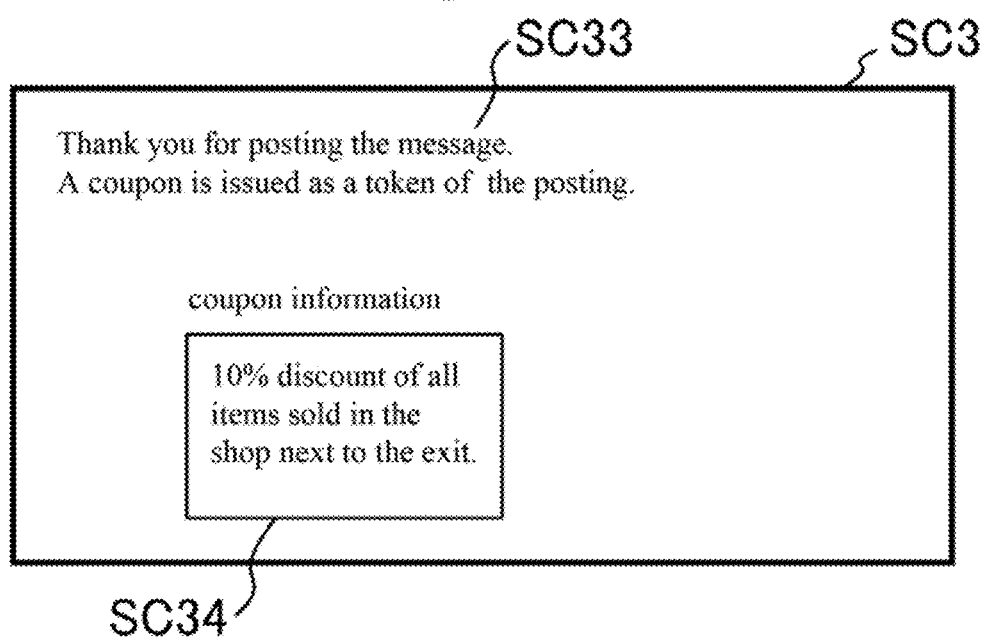

Here, FIGS. 8A and 8B are drawings illustrating the screens for inputting the message in the present embodiment. In the screen SC3 illustrated in FIG. 8A, an input field SC31 for inputting the distribution schedule of the messages and an advertisement information SC32 in addition to the comment SC11 from the system, the text input selection button SC12, the sound input selection button SC13 and the image input selection button SC14 of the system shown in FIGS. 3A and 3B. Here, FIG. 8A is an interface for posting the message. The user posting the message can input the message by pressing the text input selection button SC12, the sound input selection button SC13 or the image input selection button SC14. Because of this, the memory of the user who posted the message can be easily transferred to the future. In the present embodiment, as shown in FIG. 8A, the user who posted the message can specify the distribution schedule of the message when posting the message. In addition, the advertisement information related to the facility where the identification code is notified or the advertisement information related to peripheral facilities of that facility are displayed on the above described interface. Because of this, it is possible to facilitate to use these facilities.

When the message is posted by the user, the above described interface is shifted to the screen shown in FIG. 8B. Here, FIG. 8B is an interface for notifying the reception of the message. In the screen SC3 of FIG. 8B, a comment SC33 from the system and a coupon information SC34 are shown. In the present embodiment, when the message is posted by the user, the coupon information related to the facility where the identification code is notified and peripheral facilities can be issued immediately. Because of this, it is possible to facilitate the user to post the message.

Returning to the flow of the operation of the information processing system 100 shown in FIG. 4, when the message is posted as described above (S103) and the server 300 acquires the message (S104), then the server 300 determines the facility information to be added to the message transmitted to the user who posted the message after a lapse of a predetermined period after the user posted the message (S105). At this time, the determination unit 3033 included in the control unit 303 of the server 300 can determine the facility information which is matched with the user who posted the message based on an interest and a taste of the user information of the user who posted the message stored in the storage unit 302 of the server 300. Note that the facility information can include a predetermined privilege information.

Then, the server 300 executes the processing of transmitting the message posted by the user, acquired by the process of S104 and stored in the storage unit 302 (S106). Consequently, the user terminal 400 of the recipient acquires the message and the above described facility information which are transmitted from the server 300 (S107). Here, in the present embodiment, the above described recipient is the user himself/herself who posted the message. Therefore, the message posted by the user himself/herself is transmitted to the user who posted the message. In this case, the motivation of opening the message is given to the user who posted the message. Thus, the rate of opening the message increases.

Figure 9:
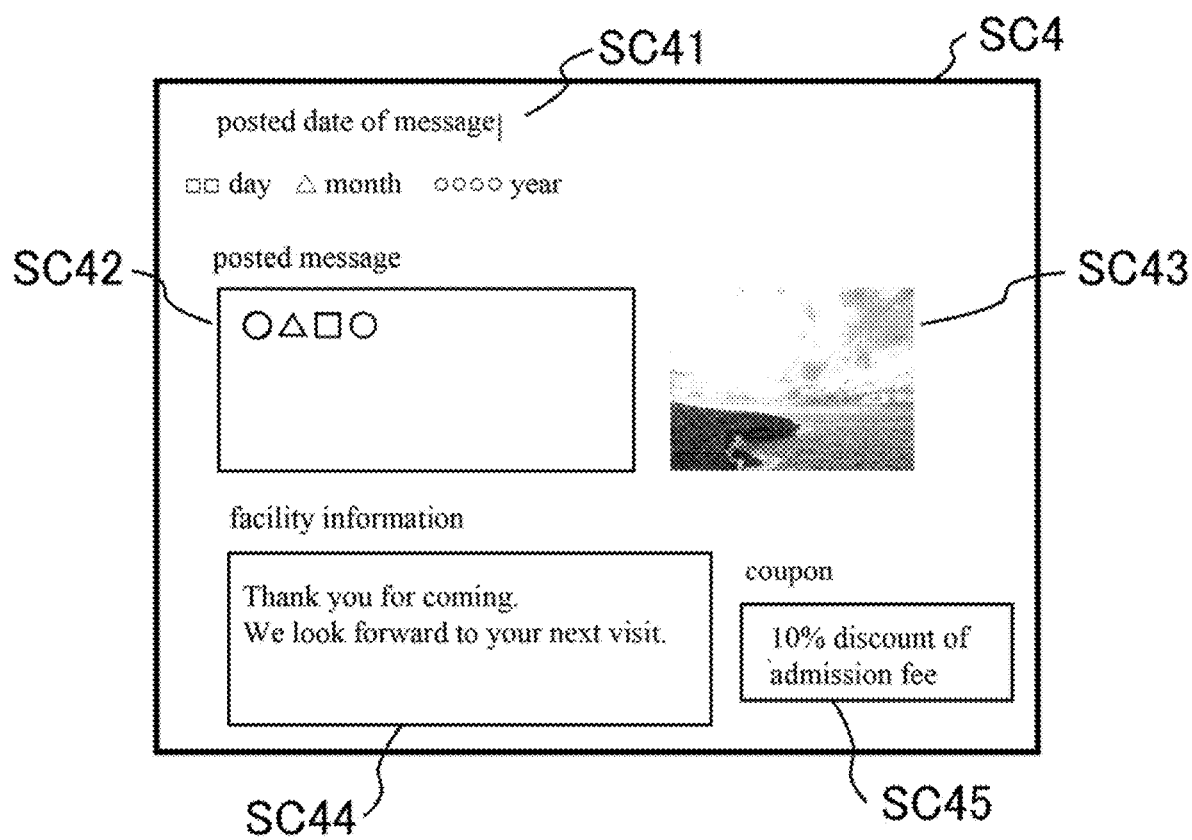
FIG. 9 is a drawing illustrating a screen for delivering a message in the second embodiment.

Here, FIG. 9 is the drawing illustrating the screen for delivering the message in the present embodiment. The distribution management unit 3034 included in the control unit 303 of the server 300 can provide the interface shown in FIG. 9 by transmitting the link to the predetermined webpage to the user terminal 400. Alternatively, it is possible to provide the above described interface via the application preliminarily installed in the user terminal 400 of the user posting the message. The screen SC4 illustrated in FIG. 9 displays a posted date SC41 of the message posted by the user, a text information SC42 which is the posted message, an image information SC43 which is the posted message, a text information SC44 which is the facility information and a privilege information SC45 which is the facility information. The user who posted the message can look back on his/her own memory by viewing the message delivered as described above. From the viewpoint of the facility to which the user who posted the message visited, since the above described facility information is added to the message posted by the user, it is possible to facilitate the user who posted the message to use the facility again. When the privilege information such as a coupon is added as the facility information, it is possible to facilitate the user to post the message. Note that the above describe delivery of the message is performed after one year from the date where the user posted the message, for example.

In the information processing system 100 of the present embodiment, the server 300 can notify the position information of the place where the identification code is notified to the user terminal 400 of the user who posted the message. In this case, it is possible for the server 300 to acquire the position information of the user terminal 400 of the user who posted the message and notify the position information of the identification code notified near the current location of the user who posted the message, for example. Note that the user terminal 400 includes a position information acquisition unit as the functional unit. The position information acquisition unit is a means for acquiring the current position of the user terminal 400. Typically, the position information acquisition unit is a GPS (Global Positioning System) device for calculating the position information by receiving a GPS satellite signal.

The identification code for notifying the position information to the user terminal 400 by the server 300 is, for example, the identification code notified in the predetermined facility. Because of this, the motivation of visiting the facility is given to the user who posted the message when the user wants to collect the identification code. From the viewpoint of the facility, since the identification code notified in the facility can be searched, it is possible to facilitate to gather the customers of the facility.

In the information processing system 100 of the present embodiment, it is possible for the server 300 to manage the messages transmitted to the user terminal 400 of the user who posted the message and the browsing authority of the facility information in addition to acquire the position information of the user terminal 400 of the user who posted the message. In this case, the server 300 transmits a link of the predetermined webpage for viewing the messages and the facility information to the user terminal 400 of the user who posted the message after a lapse of a predetermined period after the user posted the message, for example. However, the access to the above described webpage is limited and the access is permitted only when a predetermined password is inputted. When the access to the webpage is requested via the above described link, the server 300 acquires the current location of the user terminal 400 trying to access the webpage. Namely, the server 300 acquires the current location of the user terminal 400 of the user who posted the message when a request for browsing the message and the facility information which are transmitted to the user terminal 400 is requested by the user terminal 400.

When the acquired current location of the user terminal 400 is within a predetermined area including the facility issuing the facility information, the server 300 transmits the above described password to the user terminal 400. Namely, the server 300 permits to browse the messages and the facility information which are transmitted to the user terminal 400 when the current location of the user terminal 400 is located within the above described predetermined area. Here, the above described predetermined area is, for example, an area of a radius of 500 m around the facility.

Because of this, it is possible to facilitate the user who posted the message and desiring to look back on the memory of himself/herself to give the motivation to visit the facility. From the viewpoint of the facility, it is possible to facilitate to gather the customers of the facility.

When the above described information processing system 100 is used, the memory of the user can be easily delivered to the future and it is possible to facilitate to deliver the memory.

Other Embodiments

The above described embodiments are merely an example. The present disclosure can be exploited while being appropriately changed within the range not departing from the subject matter of the present disclosure. For example, the process and the means explained in the present disclosure can be freely combined as long as technical inconsistency is not generated.

In the above described first embodiment, the user who posted the message can deliver the message as the memory of the user to the bereaved third users (e.g., family and friends) when the user passed away. However, the user who posted the message may desire that the message is not viewed by the others than the third user. Therefore, after the server 300 transmits the message of the user to the third user, the server 300 can delete the message from the storage unit 302.

The above described second embodiment explained the example of inputting the identification code issued by the facility into the user terminal 400 when the user who posted the message visits the leisure facility such as the zoo and the aquarium or the hotel. However, the above described identification code can be issued by an insurance company or a graduate association of a school. For example, the insurance company can provide a service for delivering the memory of the user to the future as an additional service of the insurance. In this case, the insurance company notifies the above described identification code to a contractor of the insurance at a predetermined timing. Thus, it is possible to periodically facilitate the contractor of the insurance to post the message. Because of this, the insurance company can continuously have an opportunity to contact with the contractor of the insurance and the cancel rate of the insurance can be reduced. In this case, the facility issuing the identification code can be regarded as the insurance company.

Furthermore, in the above described first embodiment and the second embodiment, the server 300 can perform the management of a predetermined electronic coin or a predetermined electronic ticket consumed when the user posts the message. In the above described information processing system 100, when the user posts the message to the future, it is necessary to pay the electronic coin or the electronic ticket. Namely, it is necessary to transmit the electronic coin or the electronic ticket to the server 300. In this case, five electronic coins or one electronic ticket is required for posting a message, for example. It is possible for the server 300 to transmit two electronic tickets or ten electronic coins per month to the user terminal 400 of the user posting the message free of charge. By doing so, the user posting the message can post two messages per month free of charge. Because of this, it is possible to facilitate to deliver the memory of the user who posted the message to the future.

When the above described information processing system 100 is applied to the second embodiment, the server 300 can automatically transmit the electronic tickets or the electronic coins required for posting the message to the user terminal 400 at the timing where the identification code is inputted to the user terminal 400 of the user who posted the message. Consequently, the user posting the message can immediately post the message without buying the electronic tickets or the electronic coins. Because of this, it is possible to facilitate to deliver the memory of the user who posted the message to the future.

In this case, it is possible for the server 300 to receive the payment of the electronic tickets or the electronic coins automatically transmitted to the user who posted the message from the facility issuing the identification code. As described in the explanation of the second embodiment, the advertisement information of the facility can be displayed on the input screen notified to the user posting the message. Namely, the payment of the electronic tickets or the electronic coins paid by the above described facility can be regarded as the payment for displaying the advertisement. As described above, from the viewpoint of the facility, the payment of the electronic tickets or the electronic coins can be regarded as the payment for facilitating to gather the customers of the facility. On the other hand, from the viewpoint of the user posting the message, since the message can be immediately posted without buying the electronic tickets or the electronic coins, it is possible to facilitate to deliver the message of the user who posted the message to the future.

The process executed in one device in the explanation can be executed by a plurality of devices while sharing the process. For example, the notification unit 3031 can be formed on an arithmetic processing device which is different from the server 300. At this time, the arithmetic processing device is configured to be suitably operated with the server 300 in cooperation. In addition, the process executed by the other device in the explanation can be executed by one device. In the computer system, the hardware configuration (server configuration) for achieving each function can be flexibly changed.

The present disclosure can be also achieved by providing a computer program implementing the functions explained in the above described embodiments to a computer and reading/executing the program by one or more processors provided with the computer. The above described computer program can be provided to the computer via a non-transitory computer-readable storage medium capable of being connected to the system bus or provided via a network. The non-transitory computer-readable storage medium can be any type of disks such as a magnetic disk (e.g., a floppy (registered trademark) disk and a hard disk drive (HDD)) and an optical disk (e.g., a CD-ROM, DVD disk and a Blue-ray disk) and any type of media suitable for storing the electronic command such as a read-only memory (ROM), a random access memory (RAM), an EPROM, an EEPROM, a magnetic card, a flash memory and an optical card, for example.

DESCRIPTION OF THE REFERENCE NUMERALS

100: information processing system
200: network
300: server
301: communication unit
302: storage unit
303: control unit
400: user terminal

The invention claimed is:

1. An information processing device for managing a message posted by a user, the information processing device comprising:
    a control unit configured to acquire the message posted by the user and transmit the message to a predetermined recipient at a predetermined interval while dividing the message into a plurality of times, wherein
    the predetermined interval is adjusted in accordance with an attribute of the predetermined recipient,
    the control unit is further configured to transmit a notification to a user terminal of the user at a predetermined timing for guiding the user to post the message,
    the predetermined recipient is the user posting the message,
    the control unit is configured to transmit the notification at a timing where an identification code associated with a predetermined facility visited by the user is acquired by the user and inputted to the user terminal, and
    when the user posts the message based on the notification, the control unit is configured to transmit the message posted by the user and a predetermined facility information obtained from the predetermined facility visited by the user to the user who posted the message after a lapse of a predetermined period after the user posted the message.

2. The information processing device according to claim 1, wherein
    the predetermined facility information includes a predetermined privilege information.

3. The information processing device according to claim 1, wherein
    the control unit is further configured to acquire a position information of the user terminal and manage a browsing authority of the message and the predetermined facility information which are transmitted to the user terminal, and
    the control unit is configured to permit to browse the message and the predetermined facility information when a current location of the user terminal is within a predetermined area including the predetermined facility at a time when a request for browsing the message and the predetermined facility information which are transmitted to the user terminal is requested by the user terminal.

* * * * *